(No Model.)

J. M. CORNELL.
Cement Illuminating Tiling.

No. 238,858.  Patented March 15, 1881.

WITNESSES:
T. Walter Fowler.
W. E. Chaffee.

INVENTOR:
John M. Cornell
BY Jas. L. Ewin,
ATTORNEY.

UNITED STATES PATENT OFFICE.

JOHN M. CORNELL, OF NEW YORK, N. Y.

CEMENT ILLUMINATING-TILING.

SPECIFICATION forming part of Letters Patent No. 238,858, dated March 15, 1881.

Application filed December 31, 1880. (No model.)

*To all whom it may concern:*

Be it known that I, JOHN M. CORNELL, a citizen of the United States, residing at New York, in the State of New York, have invented a new and useful Improvement in Cement Illuminating-Tiling, of which the following is a specification.

This invention relates to cement illuminating-tiles or pavement-lights for admitting light to vaults beneath sidewalks. The cement filling of these tiles was introduced to render their wearing-surfaces less slippery, and it accomplishes this useful purpose; but Portland cement, which is the preferred material, is liable to crack by contraction, and is also liable to excessive expansion by heat. An effect of either is the breakage of the glass of the tile, and this, or even a crack in the cement alone, is sufficient to cause a leak through the light-holes in the iron floor of the tile. Breakage has been provided against by means of inclosing-rings cast upon the respective lenses, or adapted to receive them in the usual manner, and set upon or within the iron grating so as to be interposed between the glass and cement; but this is an expensive expedient, and does not prevent leakage in case of a break in the cement.

The primary object of the present invention is to so construct a cement illuminating-tile as to render it free from liability to the fracture of the glass by the cracking or expansion of the cement; and to this end it consists in a cast-iron floor-plate, having an integral rim around each light-hole, with the glass held therein so as to be independently water-tight.

Another object of the invention is to better protect the edges of the cement against fracture and the displacement of particles; to which end it consists in making said rims of flaring form or beveled, so that the interspaces for the reception of the cement are smaller at top than at bottom.

Another object of the invention is to protect the edges of the glass against fracture, which is accomplised by extending said rims to the wearing-surface. The integral rims, as above described, serve also to materially stiffen the cast-iron plate, to reduce the wear of the cement filling, and to preserve tight and neat joints throughout the structure.

Figure 1:
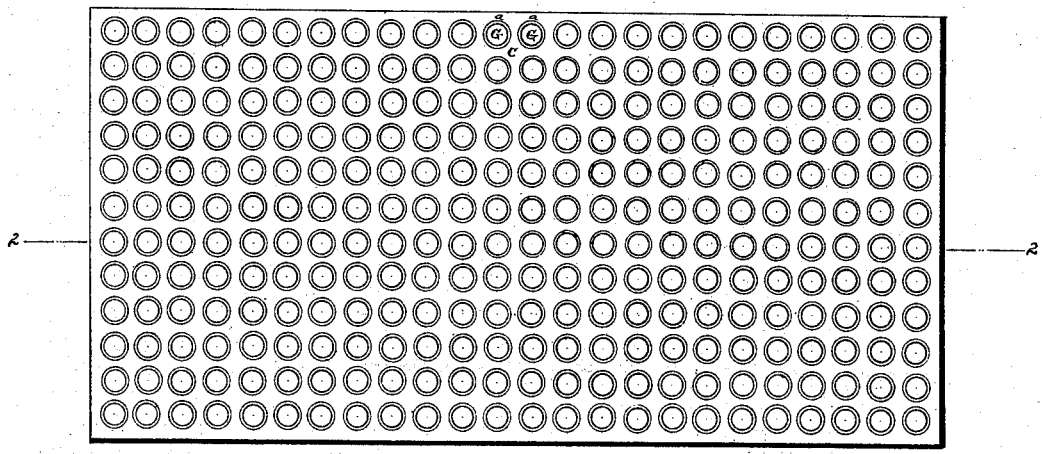
Figure 2:
Figure 3:
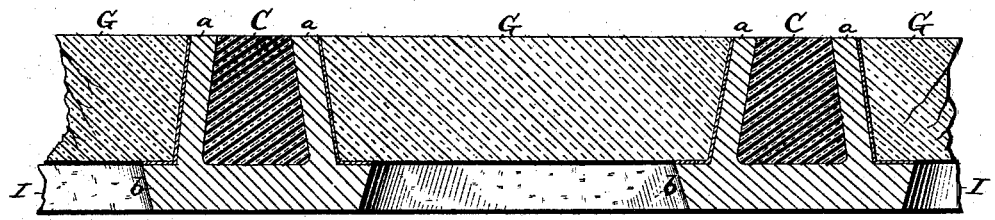

In the accompanying drawings, which form part of this specification, Figure 1 is a plan view of an illuminating-tile illustrating this invention. Figure 2 is a vertical section at 2 2, Fig. 1, and Fig. 3 is a vertical section of a fragment on a larger scale.

Like letters of reference indicate corresponding parts in the several figures.

In producing an illuminating-tile according to this invention, I cast an iron floor-plate, I, of the required shape and proportions, with light-holes $h$, of given number, size, and shape, each surrounded by an upwardly-flaring rim, $a$, and by a horizontal ledge, $b$, in the plane of the plate. Glass G is fitted to the rims $a$, and is inserted therein, and made solid and water-tight by means of putty or the like, as indicated in Fig. 3, before any cement is introduced. Finally, the spaces between the rims $a$ are filled flush with the top of the glass with cement C, introduced in a plastic state and allowed to harden, and the tile is finished.

If preferred, the introduction of the cement may be deferred until after the tile is laid, so as to cover the joints at the edges of the tile by means of the cement at the filling operation, or the cement may be put in before the glass is inserted.

The illustrative tile shown in the drawings is rectangular in shape and about two feet by four feet in size, measuring one-fourth inch thick in its horizontal body, and seven-eighths inch in total thickness to the top of the rims $a$, which is the thickness of the finished tile. The rims $a$ are one-eighth inch thick, and their internal diameter is two inches at top. The glass is in circular disks two inches in greatest diameter and five-eighths inch thick, with beveled edges. Portland cement is used in customary manner.

The shape and proportions of the tile will vary according to circumstances and taste. The glass may be of a different description, and in an inferior modification the rims $a$ may extend only high enough to hold the glass so as to be covered by the cement, or they may be used without the described flare or bevel; but I prefer and propose to make them substantially as shown, for the purposes hereinbefore stated.

I am aware that the iron casting of a tile having an illuminating surface composed of glass and asphalt has been constructed with integral ribs to form a cellular surface for affording side adhesion to natural asphalt; but these ribs do not surround the individual glasses or lenses so as to hold and protect them in the manner herein specified, nor are the glasses held therein so as to be water-tight independently of the asphalt filling of the tile.

I do not claim, broadly, an illuminating-tile having a cast-iron floor-plate constructed with integral ribs, flanges, or rims; nor rings surrounding the respective glasses or lenses in a cement illuminating-tile so as to prevent breakage of the glass by the expansion of the cement; nor an illuminating-tile having its surface composed of glass, metal, and cement or asphalt; but,

Having thus described my improved illuminating-tile, I claim as new and desire to protect by Letters Patent—

1. A cement illuminating-tile having its cast-iron floor-plate or grating constructed with integral glass-holding rims extending upward around the respective light-holes, and forming rigid and water-tight walls between the cement and the glass, substantially as herein specified, for the purposes set forth.

2. A cement illuminating-tile having its cast-iron floor-plate or grating constructed with upwardly-flaring integral rims $a$, forming rigid and water-tight walls around the respective light-holes, with the glass held therein, and a cement filling held in the upwardly-tapering spaces between said rims, substantially as herein described.

3. A cement illuminating-tile having its cast-iron floor-plate or grating constructed with integral rims $a$, forming water-tight walls around the respective light-holes, with the glass held therein, and having its interspaces filled with cement, said rims extending to the top of the glass and cement, as shown, for the purposes set forth.

JOHN M. CORNELL.

Witnesses:
H. C. TUNIS,
THOS. CROCKER.